US009105171B2

(12) United States Patent
Flood et al.

(10) Patent No.: US 9,105,171 B2
(45) Date of Patent: Aug. 11, 2015

(54) CRITICAL PARAMETER MONITORING SYSTEM FOR IMPROVING THE SAFETY OF PERSONNEL OPERATING IN HAZARDOUS AREAS

(71) Applicants: Michael G. Flood, Pensacola, FL (US); Richard J. Kotalik, Rushville, NY (US)

(72) Inventors: Michael G. Flood, Pensacola, FL (US); Richard J. Kotalik, Rushville, NY (US)

(73) Assignee: BREATHING SYSTEMS, INC., Pensacola, FL (US)

( * ) Notice: Subject to any disclaimer, the term of this patent is extended or adjusted under 35 U.S.C. 154(b) by 0 days.

(21) Appl. No.: 14/120,127

(22) Filed: Apr. 28, 2014

(65) Prior Publication Data

US 2014/0349565 A1 Nov. 27, 2014

Related U.S. Application Data

(60) Provisional application No. 61/855,774, filed on May 24, 2013.

(51) Int. Cl.

*G08B 23/00* (2006.01)
*G08B 21/02* (2006.01)
*F24F 11/00* (2006.01)

(52) U.S. Cl.

CPC .............. *G08B 21/02* (2013.01); *F24F 11/001* (2013.01); *F24F 11/0012* (2013.01); *F24F 2011/0028* (2013.01); *F24F 2011/0091* (2013.01); *F24F 2221/38* (2013.01)

(58) Field of Classification Search

CPC ........... F24F 2011/0091; F24F 11/001; F24F 11/0012; F24F 11/0017; F24F 11/0076; F24F 11/0086; F24F 2011/0028; F24F 2221/38; G08B 21/02; G01N 33/497; G06Q 10/00; H04L 63/302

USPC ................. 340/573.1, 426.1, 426.18, 426.19, 340/539.1, 539.11, 539.13, 539.26

See application file for complete search history.

(56) References Cited

U.S. PATENT DOCUMENTS

| | | | | |
|---|---|---|---|---|
| 5,984,868 | A * | 11/1999 | Shih et al. | 600/300 |
| 2002/0008625 | A1* | 1/2002 | Adams et al. | 340/573.1 |
| 2002/0140915 | A1* | 10/2002 | Miwa | 355/53 |
| 2004/0129890 | A1* | 7/2004 | Berman et al. | 250/380 |
| 2007/0084465 | A1* | 4/2007 | Heinrich et al. | 128/204.25 |
| 2007/0163935 | A1* | 7/2007 | Chewins | 210/198.1 |
| 2008/0186161 | A1* | 8/2008 | Fussner et al. | 340/539.13 |
| 2011/0308230 | A1* | 12/2011 | Takase et al. | 60/39.182 |

* cited by examiner

*Primary Examiner* — Daniel Previl

(57) ABSTRACT

A critical parameter monitoring system for improving the safety of personnel working in a remotely located hazardous location possibly containing combustible materials include an oxygen and a temperature sensor carried by the personnel. The sensors are connected to a centrally located processor which displays the oxygen level and temperature present at the sensors and issues a warning when the measured parameters exceed preset levels. The monitoring system may be a part of a breathing apparatus which supplies air and voice communications from the centralized location to personnel working in a vessel purged with an inert gas. The measured oxygen level may also be used to conserve the quantity of inert gas used in the purging process while preserving the safety of the workers.

21 Claims, 12 Drawing Sheets

CRITICAL PARAMETER MONITORING SYSTEM FOR IMPROVING THE SAFETY OF PERSONNEL OPERATING IN HAZARDOUS AREAS

RELATED APPLICATION

This application is based on and claims priority of U.S. Provisional Application 61/855,774 filed on May 24, 2013, the contents of which are incorporated herein by reference.

FIELD OF THE INVENTION

The present invention relates to a critical parameter monitoring system for improving the safety of personnel, such as inspectors and workers, operating in hazardous areas.

BACKGROUND OF THE INVENTION

One example of a hazardous area, in which workers are possibly exposed to pyrophoric conditions, involves the reconditioning of vessels in the petroleum refining, petrochemical and associated industries. Within these industries catalytic reactors are used to convert petroleum or gas feed products into multiple products, such as gasoline, diesel, aviation fuels and chemicals. Over time the catalyst material used in the process becomes contaminated with impurities present in feed products and must be removed and exchanged with new or reconditioned material. In many of these catalytic processes the impurities contain trace metals and sulfides that may become pyrophoric when exposed to an air atmosphere. To control these conditions a maintenance procedure known as "Inert Entry" is carried out.

It is well known that combustion requires three points on the "Flame Triangle" namely, fuel, heat, and oxygen. Man's early entry into catalytic reactors and the associated downtime reduction is made possible by eliminating the oxygen from the interior of the catalytic reactor vessels with an inert gas, such as nitrogen, thereby preventing combustion and greatly reducing the costly process downtime. Such downtime to the industry is frequently measured in millions of dollars of lost production. Management of the vessel's environmental temperature is additionally necessary to prevent workers from suffering from heat prostration.

The purging operation is normally carried out by providing a continuous maximum flow of nitrogen gas into the interior of the vessel to insure that an inert atmosphere is maintained at all times during the removal and replacement of the catalyst material. Typically, the cryogenic nitrogen trucked to the facility or plant for use in the purging process will be considerably more expensive than the maintenance contractor charges. For example, the cost of nitrogen may be of the order of 1 to 2 million dollars as compared to the contractor's costs, which are typically less than half that amount.

Operations similar to the above are also experienced in the Liquid Natural Gas industry, whereby maintenance is carried out inside gas storage vessels. Often it is neither possible nor practical to remove gas product from vessels and maintenance is possible only by assuring that the vessel is maintained with an inert gas purge to control oxygen ingress and prevent combustion.

Life Support Apparatus manufactured by Breathing Systems, Inc. in Florida, and others, provide breathable air and voice communications to crew members working in nitrogen purged catalytic reactors and other vessels. Each crew member wears a helmet connected to the breathable air supply and to a communications hub via a 100 to 300 foot long umbilical cable. FIG. 1, herein, is a simplified schematic of one such life support apparatus. Referring to that figure, reference numeral 10 represents a centrally located station containing an air monitor and voice communications console 10*c*, housing a breathing air monitor 10*a* and a helmet communication amplifier 10*b*. A primary 10*d* and secondary 10*e* source of breathing air, under the control of the console 10*c*, supply air to the crew member's helmet 14 via a flexible line 11. Duplex voice communications to the crew member's earphones 14*a* and from the member's microphone 14*b* are transmitted on electrical conductors 12*a-d* which form part of an umbilical cable including the air line 11. Conductors 12*b* and 12*d* may be considered to be ground wires and conductor 12*a* may be considered to be a low voltage rail, (say powered at 6 DC volts), providing power to the helmet microphone. These conductors may also serve to accommodate critical parameter sensors, to be described in connection with this invention. Additional helmets 15 are shown below the console. The voice communications not only exist between an individual crew member and an operator at the central station but also between each of the individual crew members.

FIG. 2 is a schematic diagram of a typical prior art operator's voice communication system where the inputs from the crew members microphones are supplied via input summing resistors R12 to a summing amplifier 26, then to an audio band pass filter 26*a* and ultimately through low power amplifiers 26*c* to the remote crew member's earphones.

There is a need to improve the safety of personnel working in remotely located hazardous areas or zones which may contain pyrophoric materials or combustible gas by monitoring certain critical parameters, i.e., the oxygen concentration and temperature to which the personnel are exposed. In addition there is need to allow the plant operator to conserve the amount of inert gas, e.g., nitrogen, flowing into the vessel and its cost while still maintaining an adequate inert atmosphere to which the worker inside the vessel is exposed.

SUMMARY OF THE INVENTION

A critical parameter monitoring system for improving the safety of personnel operating in a remotely located hazardous area, possibly containing pyrophoric materials or combustible gas, in accordance with the present invention includes an oxygen and a temperature sensor carried by (or located in close proximity to) the personnel worker with the sensors transmitting signals representative of the oxygen concentration and temperature to a centrally located system processing unit or system processor. Preferably, the sensor signals, in analog form, are transmitted by wire to the system processor where the signals are converted to digital format. Also, the system processing unit is arranged to provide a warning signal when the oxygen and/or temperature have exceeded allowable limits, with the limits being modifiable by an operator. Where the temperature sensor signal involves a relative lengthy time constant, resulting in a potential significant difference between the sensor measurement and the actual temperature, the system processor 1) includes a high resolution analog-to-digital converter, and 2) is arranged to provide a rate of change of the measured temperature and an estimated actual temperature between measurements.

A specific embodiment of the critical parameter monitoring system of this invention constitutes an addition to and an improvement of a conventional life support apparatus in which breathable air and duplex voice communications are provided, via an umbilical cable from the centralized location, to personnel located in hazardous areas. In this embodiment the wires carrying the sensor signals may be embedded in the cable and share the wires carrying the voice signals. This arrangement, not only enables personnel to operate in hazardous areas, such as the interior of refinery vessels, under a largely inert atmosphere, by providing the personnel with breathable air and duplex voice communications from a central location, but in addition monitors critical parameters to improve personnel safety.

In addition to improving the safety of the personnel, the monitoring system, and in particular the oxygen sensor portion thereof, can provide in real time, the oxygen concentration in the vessel to the plant operator or an automated servo arrangement regulating the flow of inert gas into the vessel. With this information the flow of inert gas can be controlled to minimize its use while still improving the safety of the personnel within the vessel.

DESCRIPTION OF THE PREFERRED EMBODIMENT

Figure 1:
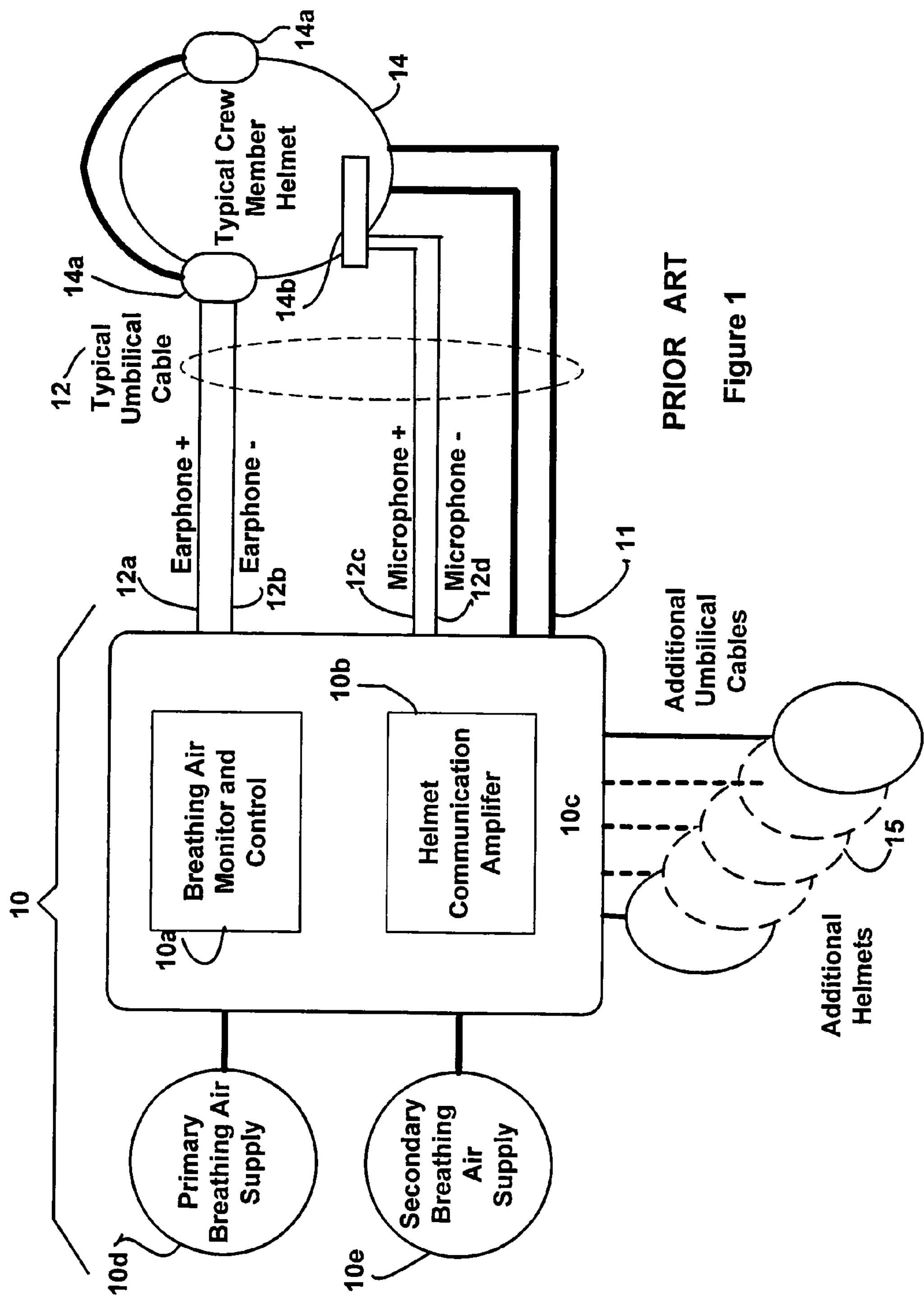
FIG. 1 is a simplified schematic diagram of a prior art life support apparatus showing a central station with a source of breathing air and a monitor for controlling the air to and communications with a crew member wearing a helmet.
Figure 2:
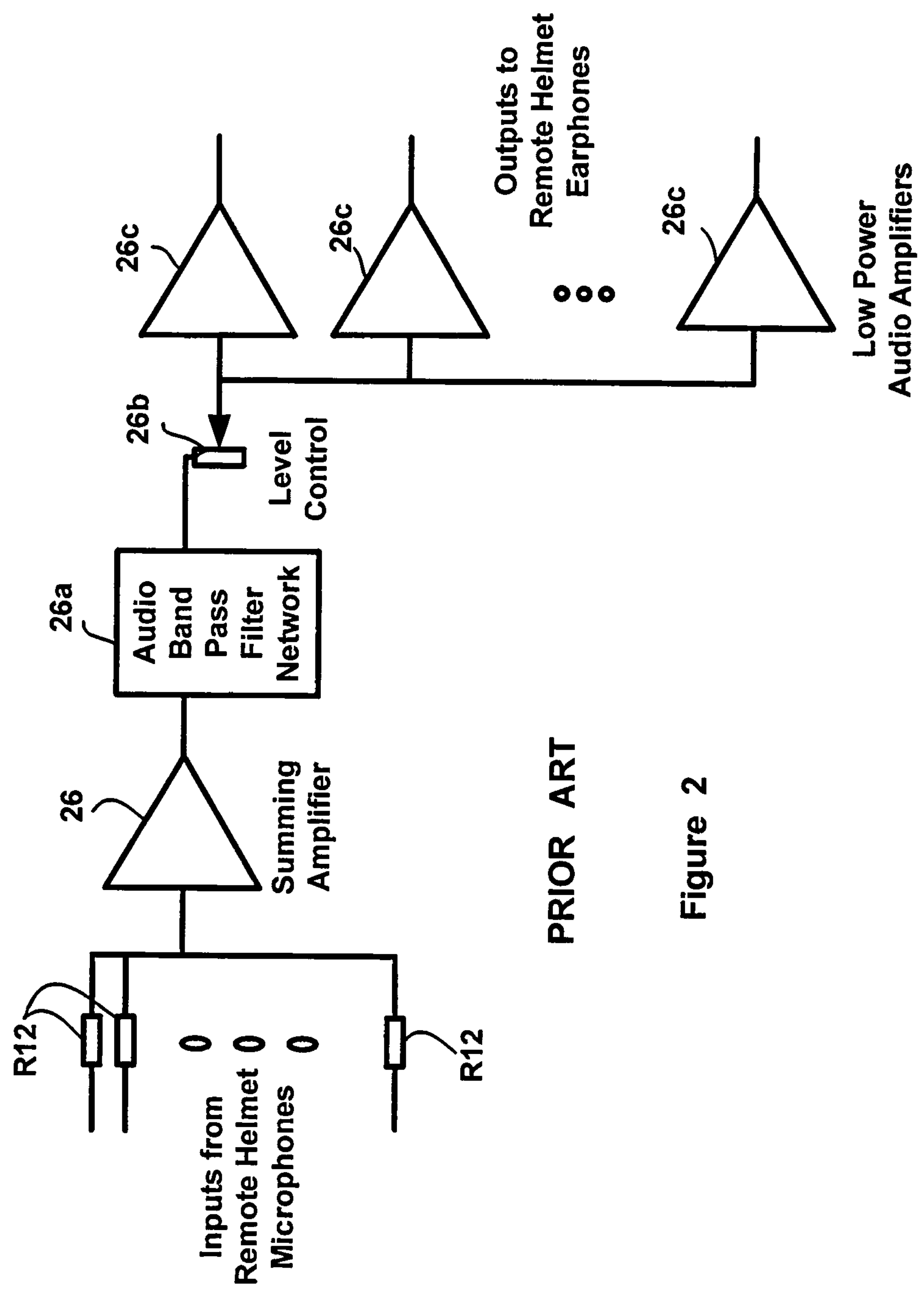
FIG. 2 is a simplified block diagram showing the prior art voice communication system.

Discussion of the Invention as an Addition to a Conventional Life Support System The monitoring system of the present invention, while useful, without breathing apparatus, is illustrated in FIGS. 3-10 as an improvement to the conventional breathing apparatus illustrated in FIG. 1. In this embodiment the sensor signals share the umbilical cable carrying breathable air and voice signals to the personnel or crew members operating in the hazardous area or zone. It is to be noted that the signals representing the oxygen and temperature parameters (being monitored) are relatively static compared to frequencies associated with voice communication signals between the personnel and the central station; this allows signals representing both the monitored parameters and voice to share the umbilical conductors with the voice signals being separated by frequency content. The parameter signals are transmitted at low frequency, essentially DC levels on the microphone and speaker conductors.

Figure 3:
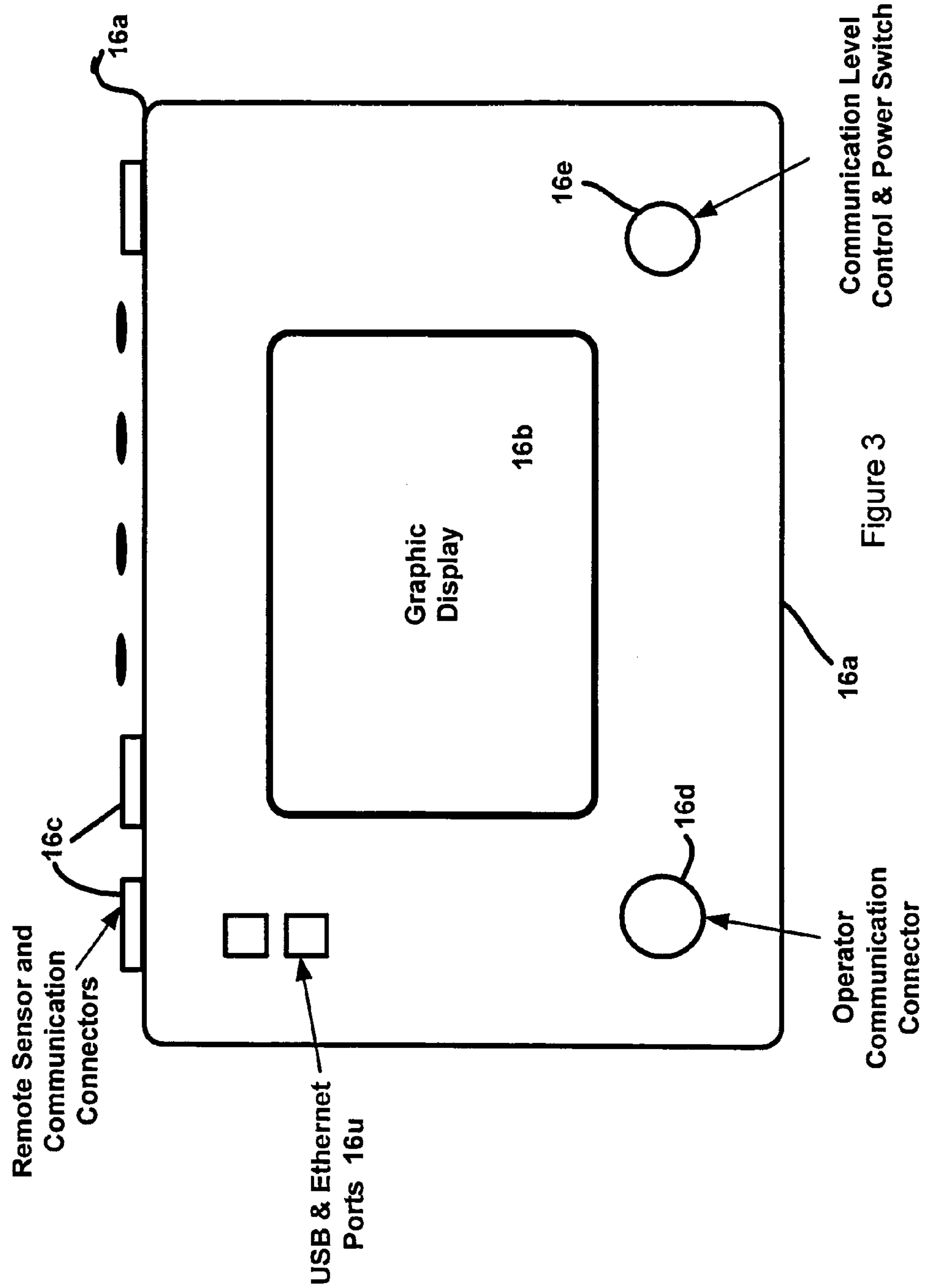
FIG. 3 is a typical implementation of a display unit incorporated in the system processing unit of this invention.
Figure 4:
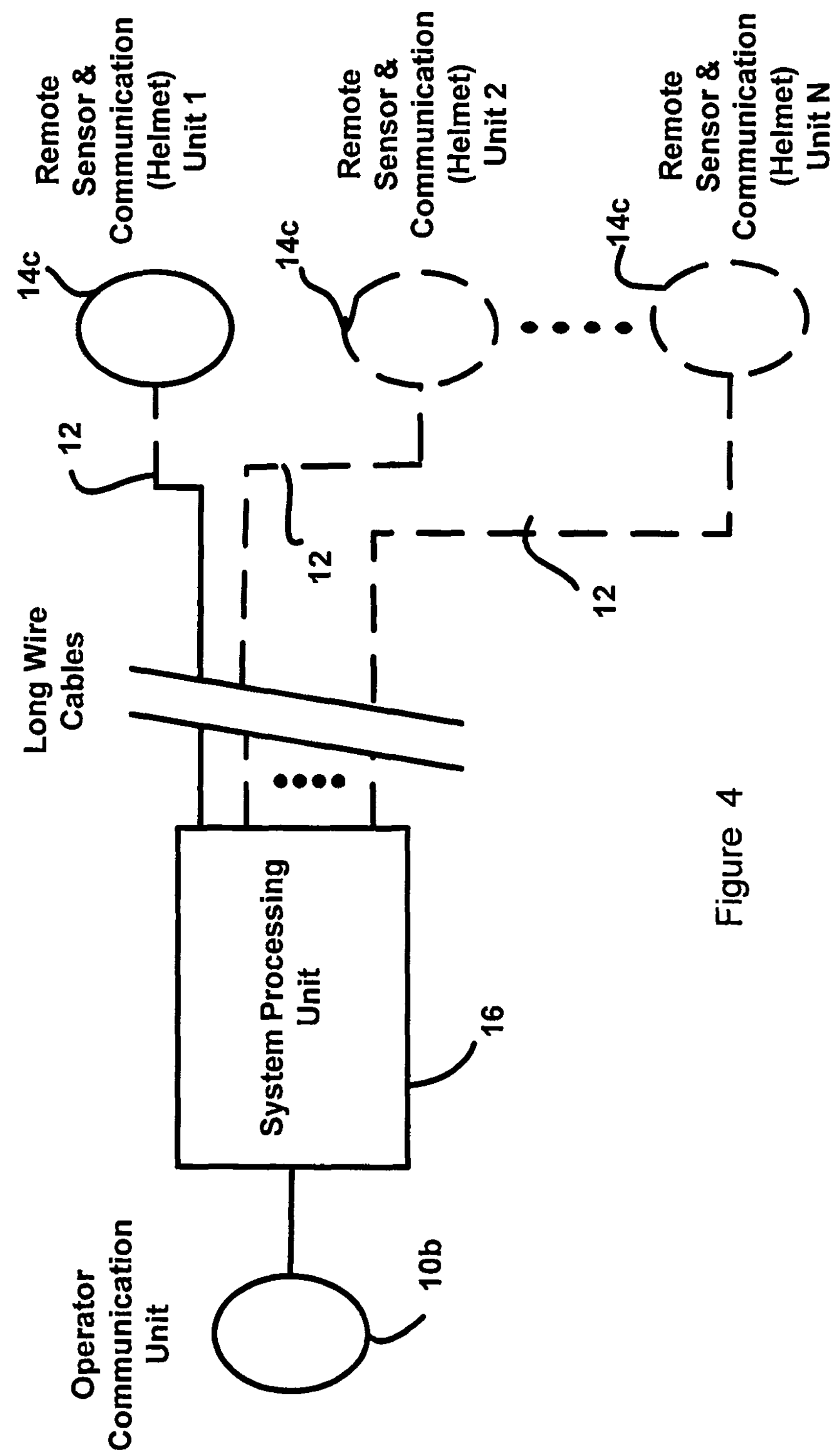
FIG. 4 is a simplified block diagram showing the prior art voice communication apparatus including remote critical parameter measuring sensors and the central system processing unit of the present invention.

A typical equipment interconnection configuration is shown in FIGS. 3 and 4 where the signals from the sensors, to be described, are sent to a system processing unit 16 located at the centrally located station 10. This processing unit translates the signals (analog in form) produced by the sensors into engineering terms, such as the concentration of oxygen in percentage and the temperature in Fahrenheit and Celsius degrees. The translated signals are displayed on a monitor 16*b* of a computer 16*a* forming a part of the system processing unit 16. As shown, the computer includes remote sensor and communication connectors 16*c* (via leads 12*a-d*), an operator communication connector 16*d* and a communication level control and power switch 16*e* as well as conventional USB and Ethernet ports 16*u*.

Discussion of the Helmet Mounted Oxygen and Temperature Sensors

Figure 5A:
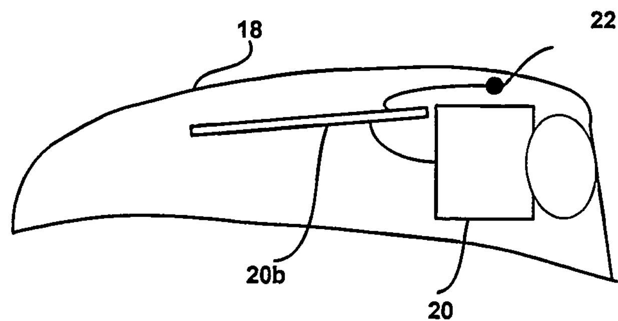
FIGS. 5*a* and 5*b* are simplified side and plan views, respectively, of a module arranged to be fitted to a crew member's helmet, in which oxygen and temperature sensors are mounted.
Figure 5B:
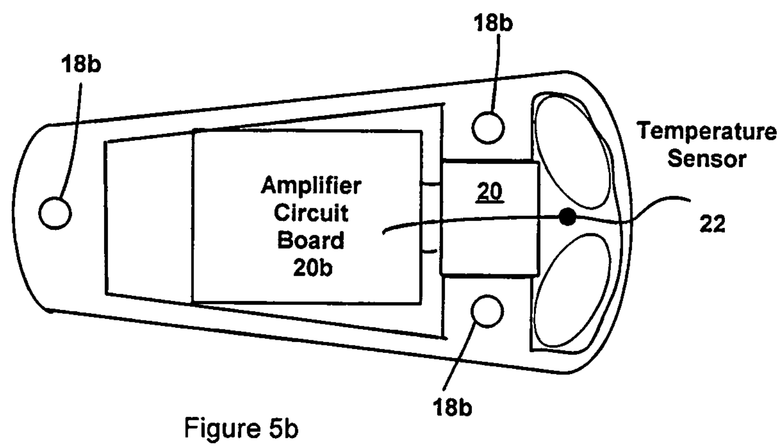

The oxygen (20) and temperature (22) sensors, in an exemplary embodiment, are shown in FIGS. 5*a* and 5*b*, as mounted in a module 18 arranged to be secured to the top of a crew member's helmet via holes 18*b*. Both the oxygen and the temperature sensors are off-the-shelf products. The temperature sensor may be a thermistor, the resistance which varies with the temperature. One type of oxygen sensor is available from City Technology located in England. The oxygen sensor utilizes a specialized amplifier integrated network 20*a* (FIG. 6), mounted on a circuit board 20*b* to increase the low level oxygen signal (a few millivolts in amplitude) to a level sufficient to reduce the transmission effects of loss and noise in the long umbilical cable.

Discussion of the Oxygen Sensor Amplifier Network

Figure 6:
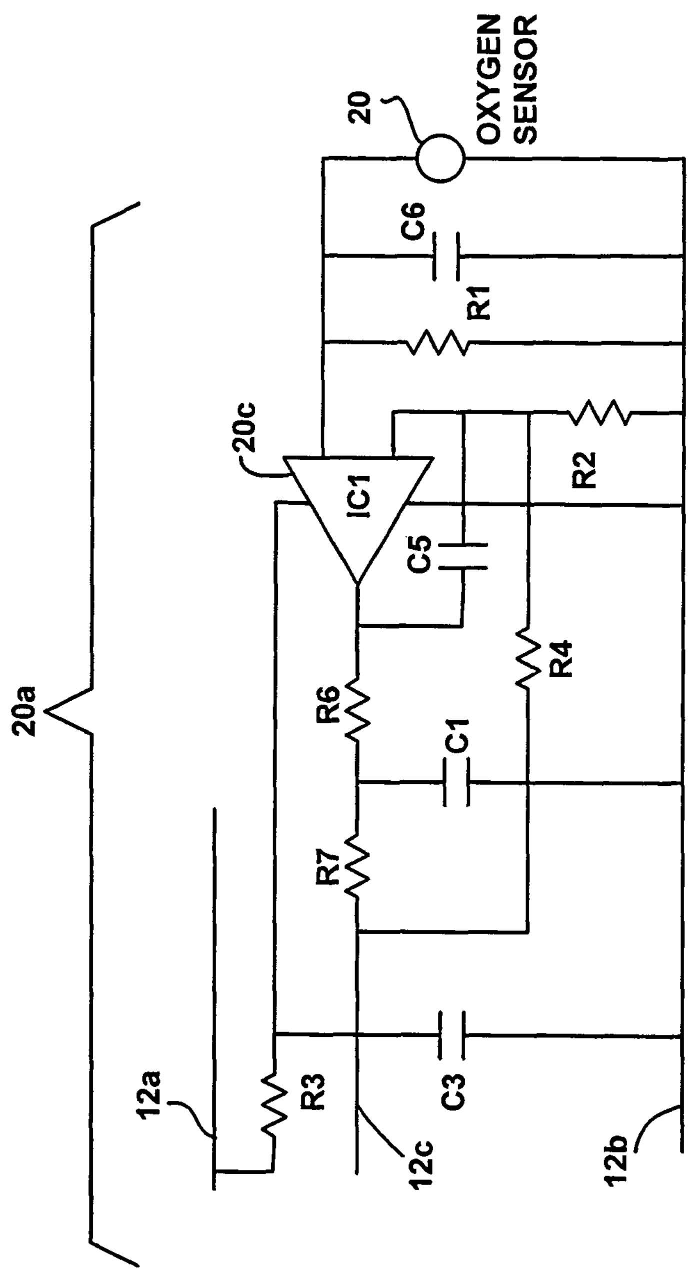
FIG. 6 is a schematic circuit diagram of an amplifier and a long-line-driver circuit for amplifying the output signal from the oxygen sensor.

The specialized amplifier network 20*a*, shown in FIG. 6, drives the umbilical cable with a low output impedance at low frequencies to reduce loading errors. The network isolates the output of an operational amplifier 20*c* from the audio communication signals present on the umbilical wiring to preclude attenuating the voice communications, overdriving the amplifier and impacting the DC performance and linearity. The amplifier network also achieves these functions with a low level input referenced to the voltage supply rail resulting from the oxygen sensor output.

The amplifier 20*c* is powered from the limited power supplied to the microphone, for example, via conductors 12*a* and 12*b*. During outgoing voice communications the microphone modulates the current in the supply line and subsequently the supply voltage in a well-known manner. The amplifier 20*c* requires little current so that it can be powered from the existing supply rail on requires little current so that it can be powered from the existing supply rail on conductor 12*a* without affecting microphone performance. The amplifier is designed to tolerate the varying supply voltage due to audio component. The current load presented by the amplifier is a constant independent of the voltage so that the microphone audio signal is not attenuated.

Referring again to FIG. 6, the operational amplifier 20*c* has its input connected across the oxygen sensor 20 in combination with capacitor C6 and resistors R1 and R2 as shown. Voltage is supplied to the amplifier via conductor 12*a* (the microphone supply rail) through resistor R3. Resistors R7, R6, R4, and capacitors C1, C3, and C5 make up the rest of the circuit, in manner which will be understood by those skilled in the art.

Discussion of the Temperature Sensor Circuit

Figure 7:
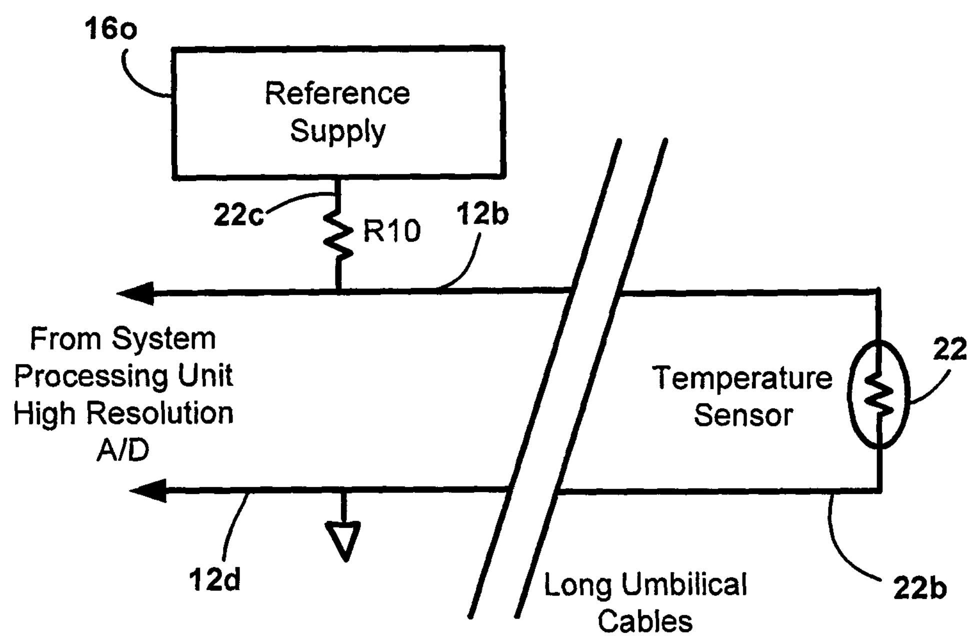
FIG. 7 is a simplified schematic showing the placement of the temperature sensor between two of the voice communication conductors with one conductor receiving a reference voltage.

Referring now to FIG. 7, the temperature sensor 22, a two-wire device, is driven by a quasi-constant current source, (the reference supply 16*o* in combination with resistor R10) supplied by the system processing unit 16. As a result, its terminal voltage (across points 22*b* and 22*c*) is a function of the temperature sensed. To accommodate the temperature sensor in the four-wire umbilical cable it is necessary to merge the ground connections into one wire, such as conductor 12*d* and use the now vacated ground wire, such as wire 12*b*, to supply current to the sensor and allow the system processing unit to measure the voltage across the sensor, as is illustrated in FIG. 7. The voltage across the temperature sensor and the associated (voltage dropping) resistor R10 may be of the order of 5 volts. The voltage drop across the temperature sensor, per se, under normal operating conditions will vary by a fraction of a volt.

Discussion of the Receipt of and Processing of the Sensor and Audio Signals

Figure 8:
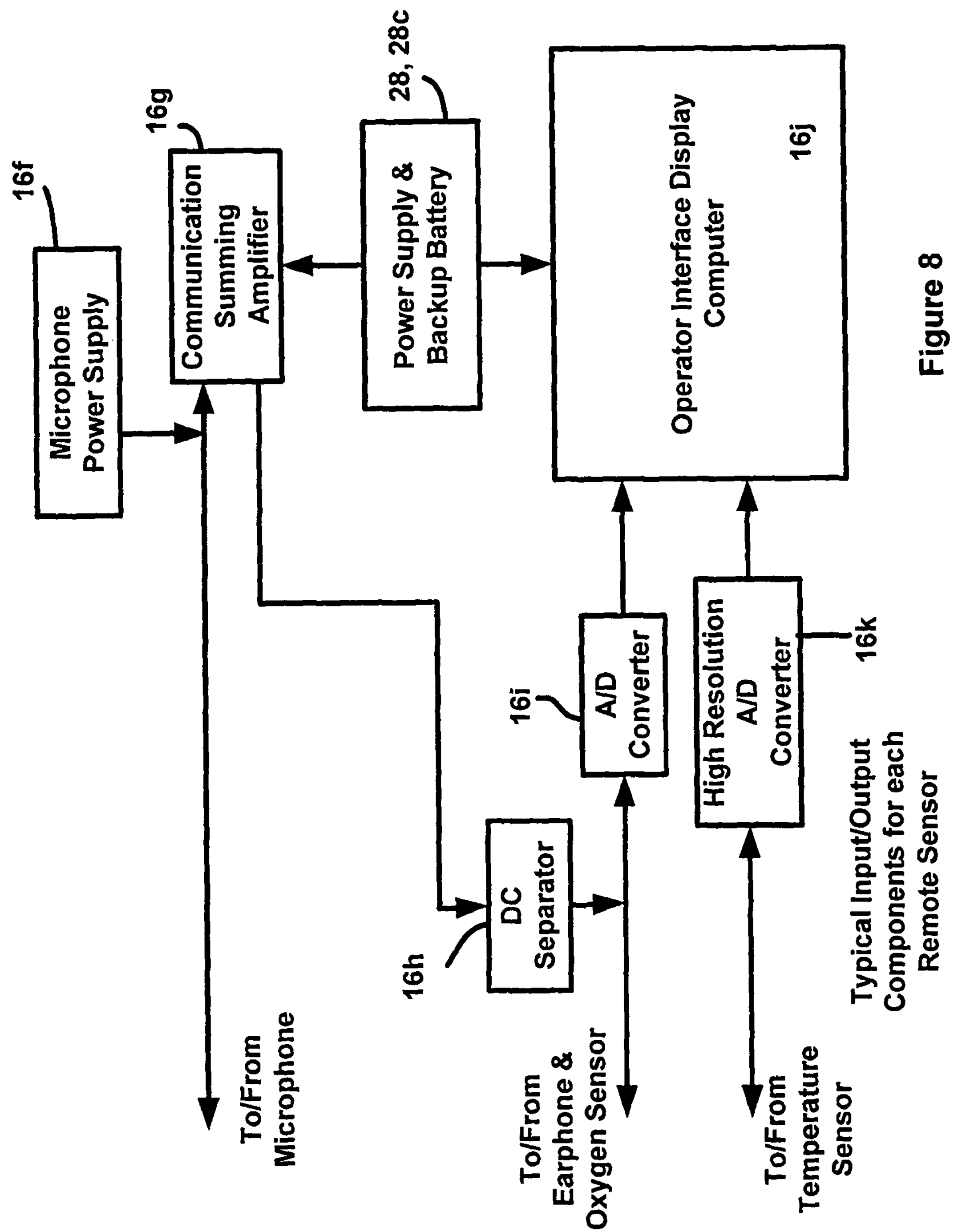
FIG. 8 is a block diagram of a display unit forming a part of the system processing unit.

An operator interface display, included within the system processing unit 16, is shown in FIG. 8. The crew members' microphones are powered from summing amplifier 16*g*. The output from the summing amplifier is supplied to the headphone earphones via the DC separator 16*h* which separates the audio and sensor signals. The sensor signals are sent to an operator interface display and computer 16*j* via A/D converters 16*k* and 16*i*, which digitize the incoming analog sensor signals. While the umbilical cable handles both the two channel (duplex) audio to and from each of the crew members as well as the low frequency sensor signals, the display separates out these components and routes them to the appropriate sections, as noted.

Figure 9:
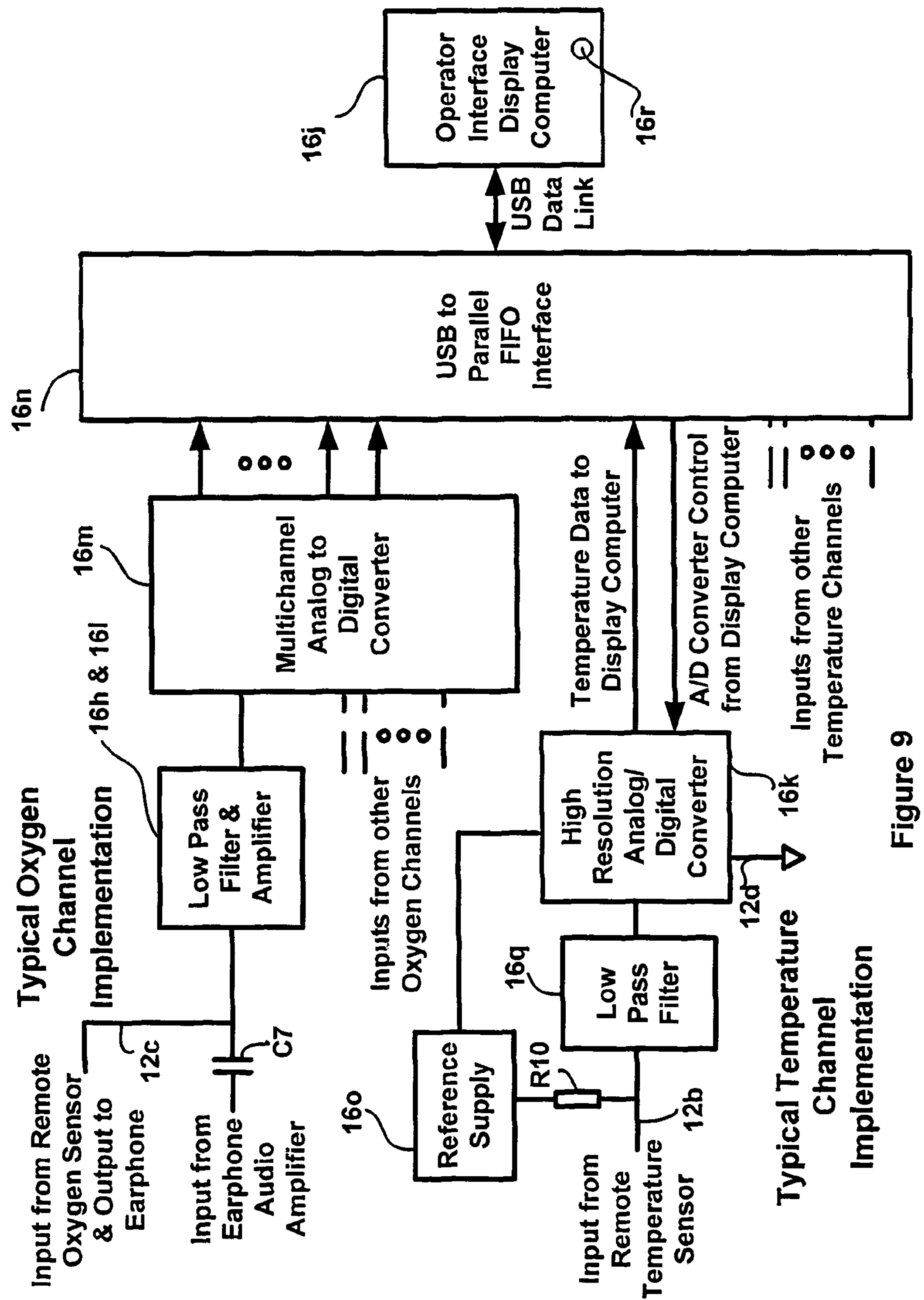
FIG. 9 is a system data processing and display schematic diagram directed to the receipt of the oxygen and temperature sensor signals.

FIG. 9 is a more detailed schematic of the display of FIG. 3 directed only to the receipt and processing of the sensor signals. The signal flow from the oxygen sensor 22 is from the helmet 14 via conductor 12*c* to the low pass filter and amplifier 16*h*, 16*i*, and then to a multi-channel analog to digital converter (A/D) 16*m*, which is arranged to receive additional oxygen sensor signals as noted. The incoming voice signals are blocked by a capacitor C7. The output from the A/D converter 16*m* is applied to a computer/display 16*j* via a conventional USB to a parallel FIFO interface 16*n*. The signal flow for the earphones is opposite to that for the oxygen sensor, i.e., from the audio amplifier through capacitor C7 to the helmet via conductor 12*c*.

The output from the temperature sensor is applied through a low pass filter 16*q* to the high resolution A/D converter 16*k*, with greater than 16 bit conversion output, and then to the computer/display via the USB interface 16*n*. Timely temperature information is required, but the time required for the measurement sensor to attain the surrounding air temperature and its receipt at the computer is affected by the thermal mass and the time constant of the sensor and its mounting enclosure. The working environment demands a robust sensor enclosure that results in a massive unit with a long thermal time constant. Quicker temperature indication is achieved using the high resolution A/D converter to provide small temperature change information between subsequent conversions. The computer is programmed to extrapolate the temperature change between measurements modified by the thermal time constant to provide a rapid estimate of the current environment temperature and the final expected value read by the sensor. This technique results in more timely environmental temperature indications and significantly reduces the effective temperature settling time. Since the A/D converter 16*k* uses the same reference as the temperature sensor resistive network, its absolute level is immaterial to the measurement, thereby eliminating the need for an accurate, stable reference.

Versatility of the Computer and Display

The computer and display convert the input data for several workers to oxygen and temperature engineering units and displays it on the computer screen for monitoring by the operator. The display unit compares the specific level of crew members' oxygen and temperature with objective levels and actuates alarms when critical levels are exceeded. The operator can adjust the critical levels for the job requirements, via slewing controls 16*r* (FIG. 9), allowing integer step changes. In addition, an alarm can be triggered when the oxygen level is above or below a set limit; thus, the system can be easily configured either for environments which are devoid of oxygen or environments which require adequate levels of breathing oxygen. The display is also programmed to allow the operator to command rapid calibration of the oxygen sensor and display using known ambient oxygen level of free air. The display also allows the operator entry of crew member names and operational status for association with displayed parameter levels. The operator may also place unused units of the multiple crew members' display in a "standby" mode. The computer is also programmed to produce a digital data log file of the measured parameters, crew member names, any operator entered changes to operating parameters, and comments. The file format is compatible with spreadsheets for easy download and analysis.

Brief Discussion of a System Power Supply

Figure 10:
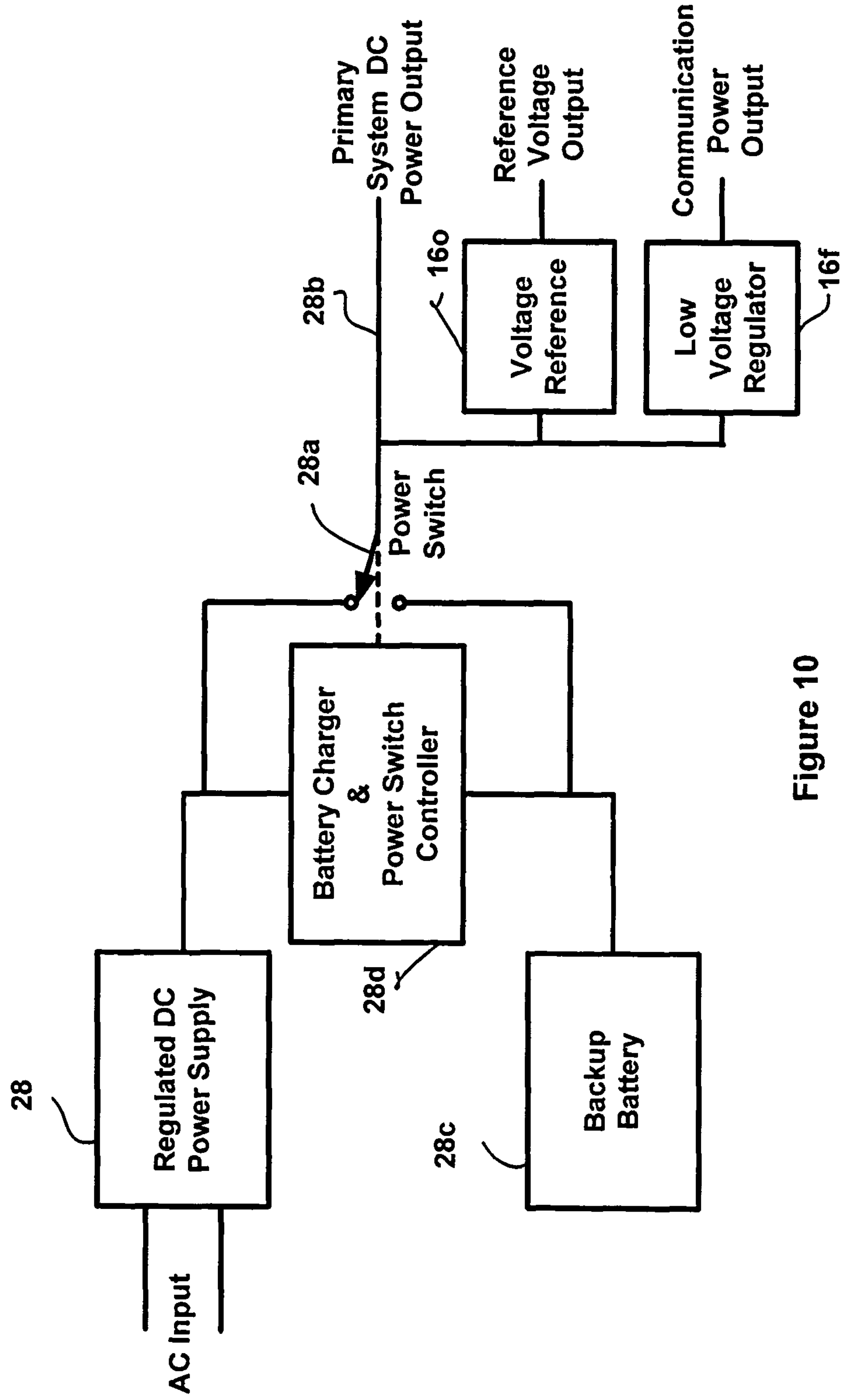
FIG. 10 is a block diagram of a system power supply.

FIG. 10 shows a simple power supply for the system processing unit where AC is applied through a regulated DC power supply 28 through a switch 28*a* to the primary system DC power outlet 28*b*, a voltage reference supply 16*o*, and to the low voltage regulator 16*f*. A backup battery 28*c* and battery charger serve to supply power in the event that the AC source is unavailable.

Figure 11:
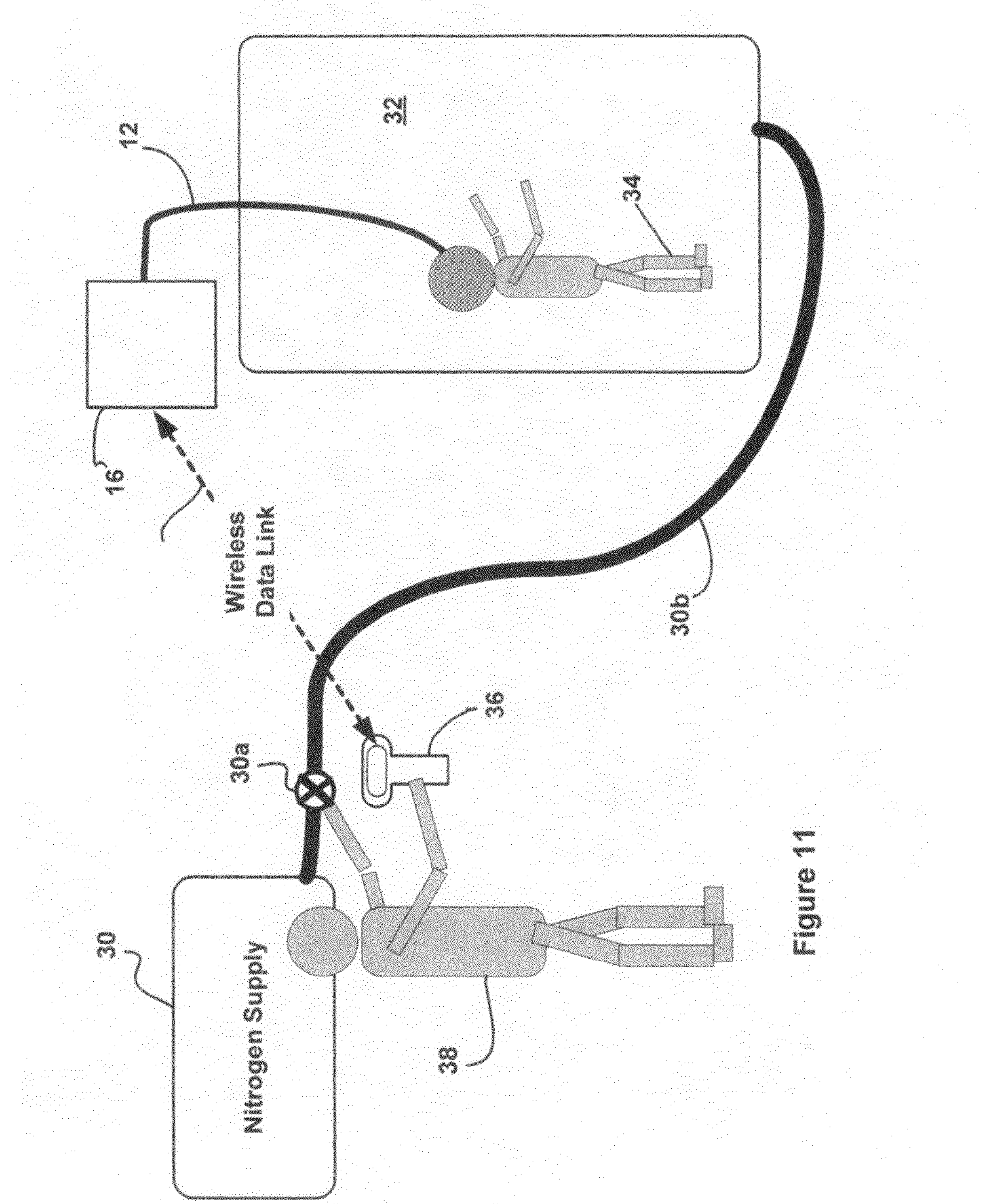
FIG. 11 is a simplified schematic showing the use of the personnel carried oxygen sensor and the system processing unit to allow a plant operator to control the flow of an inert gas into the vessel.

Discussion of the Use of the Sensed Oxygen Level to Conserve the Use of the Purging Gas Referring now to FIG. 11, a tank of liquid nitrogen 30 is connected through a manually adjustable flow control valve 30*a* and a line 30*b* to an opening (not shown) in a vessel 32 to be purged. A crew member 34, equipped with at least an oxygen sensor 20, is shown within the interior of the vessel. The oxygen sensor provides signals representative of the oxygen concentration and transmits the signals to the system processing unit 16 as discussed previously. Data representing the oxygen level is transmitted from the processor 16 to a monitor 36, for example, via a wireless data link to inform a plant operator 38, in real time, of the oxygen level within the vessel. This information enables the plant operator to control the flow of inert gas into the vessel through the valve 30*a* and thereby maintain the oxygen level within the vessel at a safe level, such as a maximum oxygen concentration of say between 3-4 percent, while conserving the use of the inert gas.

Figure 12:
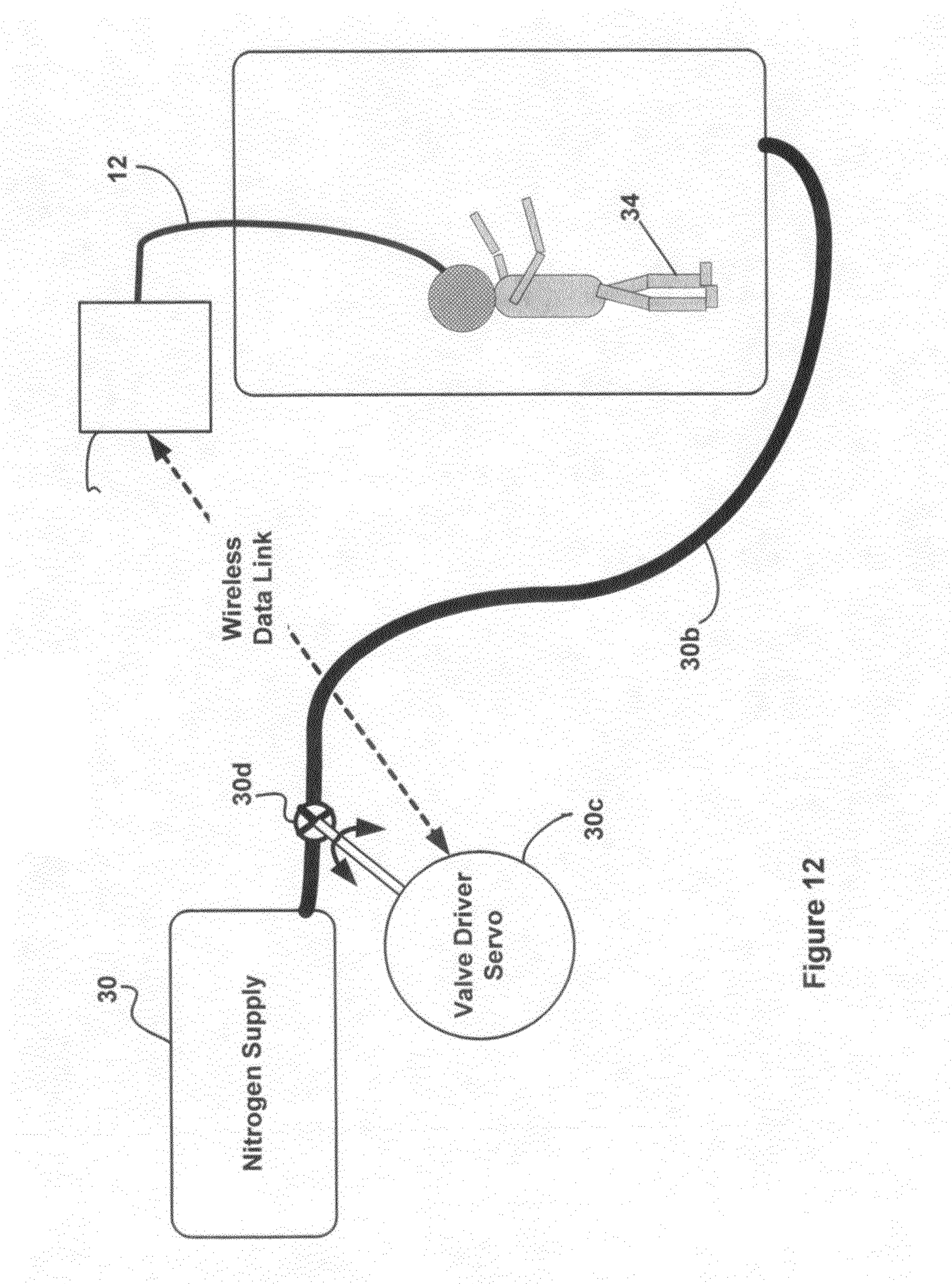
FIG. 12 is a simplified schematic illustrating the use of a servo system to provide automatic control of the flow of inert gas into the vessel.

FIG. 12 illustrates an automated inert gas flow control system in which the signals representing the vessel's interior oxygen level are transmitted to a valve driver servo 30*c*. The servo 30*c* responds to the measured oxygen concentration and drives a variable flow valve 30*d* to increase or decrease the flow of inert gas into the vessel to maintain the desire oxygen level in the vessel, eliminating the need for manual control

CONCLUSION

The critical parameter monitoring system, described above, enhances the safety of personnel operating in a remote area or zone which possibly contains pyrophoric materials or combustible gas by providing an oxygen and a temperature sensor carried by the personnel, the sensors transmitting representative signals to a centralized location for review and analysis. The monitoring system is particularly useful as an addition to a life support apparatus which provides breathable air and voice communications from a central location to workers in restoring or reconditioning essential material within the interior of inert gas purged vessels, used, for example, in the petrochemical, petroleum refining, or LNG industries In addition to the monitoring system's value in improving the safety of crew members working within purged vessels, the sensors, and in particular the oxygen sensor, may be used to conserve the flow of inert gas into vessels being purged while maintaining a safe working environment.

Various modifications and possible improvements will untouchably occur to those skilled in the art without departing from the spirit and scope of our invention as defined in the appended claims.

The invention claimed is:

1. In a life support apparatus enabling personnel to provide services to within the interiors of one or more remotely located vessels under a largely inert atmosphere with the possibility of pyrophoric materials or combustible gas being present in which breathable air and duplex voice communications are provided to personnel from a central location via an umbilical cable, an improvement of a critical parameter monitoring system comprising;

a. an oxygen sensor and a temperature sensor located adjacent each personnel and arranged to provide signals representative of the oxygen concentration and temperature, respectively; and b. a system processing unit located at the central location and connected to each of the sensors, the system processing unit arranged to translate the signals from the sensors into the oxygen concentration and the temperature present at the sensors.

2. The life support apparatus of claim 1 wherein the sensors are carried by the personnel, the signals produced by the sensors are in analog form and wherein the system processing unit includes analog to digital converters for transforming the signals to digital format.

3. The life support apparatus of claim 2 wherein the signals provided by the sensors are transmitted to the processing unit via the umbilical cable connection.

4. The life support apparatus of claim 3 wherein the voice communications include a personnel microphone and wherein each umbilical cable includes a plurality of wires including a low voltage rail and ground providing power for the personnel's associated microphone and voice communications back to the central location; and wherein the oxygen sensor is incorporated into an amplifier deriving power from the low voltage rail and the network having an output connected across the conductors carrying voice signals from the central location.

5. The life support apparatus of claim 4 wherein the system processing unit is arranged to provide a reference supply voltage on a separate wire in the umbilical cable and wherein the temperature sensor is in the form of a temperature dependent variable resistor, the variable resistor being connected between the separate wire and ground.

6. The life support apparatus of claim 5 wherein the system processing unit is programmed to allow the oxygen and temperature parameters to be set at allowable limits.

7. The life support apparatus of claim 6 wherein the system processing unit is programmed to provide notification when the allowable limits have been reached.

8. The life support apparatus of claim 7 wherein the analog to digital converter for the temperature signal is a high resolution converter and wherein the system processing unit is programmed to provide a rate of change of the temperature sensed and an estimated temperature between measurements.

9. The life support apparatus of claim 1 wherein the remotely located vessels are purged with an inert gas supplied from a gas source via a flow valve, the critical parameter monitoring system further including means responsive to the measured oxygen level for controlling the flow control valve to increase or decrease the flow to maintain the oxygen level within the vessels at a desired level.

10. The life support apparatus of claim 9 wherein the flow control valve is manually operated and the means for controlling the valve is an operator with access to the measured oxygen level.

11. The life support apparatus of claim 9 wherein the flow control valve is under the control of a servo mechanism responsive to the measured oxygen level.

12. A purging system for maintaining an inert atmosphere in the interior of a vessel to protect service personnel located in the vessel comprising:

(a) a source of inert gas arranged to direct the gas into the interior of the vessel through a line and a flow control valve;

(b) an oxygen sensor located adjacent the personnel, the sensor providing signals representative of the oxygen concentration present at the sensor;

(c) a system processing unit exteriorly located relative to the vessel and connected to the sensor, the processing unit being capable of translating the sensor signal into a measure of the oxygen concentration present at the sensor; and (d) means responsive to the measured oxygen signal for controlling the flow control valve to increase or decrease the flow to maintain the oxygen level at a desired concentration.

13. The purging system of claim 12 wherein the inert gas is nitrogen, the flow control valve is manually controlled and the means responsive to the measured oxygen level for controlling the flow control valve is an operator.

14. The purging system of claim 13 including a monitor located adjacent the operator and in data communication with the system processing unit, the monitor displaying the oxygen concentration measured by the sensor.

15. The purging system of claim 12 wherein the flow control valve is under the control of a servo mechanism responsive to the measured oxygen level.

16. The purging system of claim 15 wherein the oxygen sensor is carried by the personnel and wherein the servo mechanism comprises a valve driver mechanically coupled to the flow control valve.

17. A life support apparatus and critical monitoring system enabling the personnel to provide services within the interiors of one or more vessels under a largely inert atmosphere with the possibility of pyrophoric materials or combustible materials present in the vessels comprising:

(a) a source of breathable air and a duplex voice communication console located in a central location remote from the vessel;

(b) a helmet for each personnel;

(c) an umbilical cable connected between each helmet, the source of breathable air and the communication console to provide breathable air and duplex voice communications to each of the personnel;

(d) an oxygen sensor and a temperature sensor mounted on each helmet, the oxygen and temperature sensors providing signals representative of the oxygen concentration and temperature, respectively; and (e) a system processing unit located at the central location and connected to each of the sensors through the umbilical cable, the system processing unit being arranged to translate the signals from the sensor into the oxygen concentration and temperature present at the sensors.

18. The life support apparatus and monitoring system of claim 17 wherein the system processing unit is programmed to establish allowable limits for the parameters and provide notification when the limits have been exceeded.

19. The life support apparatus and monitoring system of claim 18 wherein the system processing unit is arranged to allow an operator to set the allowable limits.

20. The life support apparatus and monitoring system of claim 19 wherein the signals produced by the sensors are in analog format, and wherein the system processing unit includes analog to digital converters for transforming the signals to a digital format.

21. The life support apparatus and monitoring system of claim 20 wherein the analog to digital converter receiving the temperature sensor signals is a high resolution converter, and wherein the system processing unit is programmed to provide a rate of change of the measure temperature and an estimated temperature between measurements.

* * * * *